(12) United States Patent
Jin

(10) Patent No.: US 8,117,723 B2
(45) Date of Patent: Feb. 21, 2012

(54) JIG FOR ASSEMBLING VARIOUS TYPES OF FRONT END MODULES TO VEHICLES

(75) Inventor: Yo-Hee Jin, Chungcheongnam-do (KR)

(73) Assignee: Hyundai Motor Company, Seoul (KR)

( * ) Notice: Subject to any disclaimer, the term of this patent is extended or adjusted under 35 U.S.C. 154(b) by 1459 days.

(21) Appl. No.: 11/607,288

(22) Filed: Nov. 30, 2006

(65) Prior Publication Data

US 2008/0092391 A1    Apr. 24, 2008

(30) Foreign Application Priority Data

Oct. 10, 2006 (KR) .................. 10-2006-0098320

(51) Int. Cl.
*B21D 53/88*    (2006.01)
(52) U.S. Cl. .................. 29/281.5; 29/468; 29/897.2
(58) Field of Classification Search .................. 29/897.2, 29/824, 281.5, 281.4, 430, 464, 468, 469, 29/791
See application file for complete search history.

(56) References Cited

U.S. PATENT DOCUMENTS

| | | | | |
|---|---|---|---|---|
| 4,589,184 A * | 5/1986 | Asano et al. | .................. | 29/430 |
| 4,736,515 A * | 4/1988 | Catena | .................. | 29/714 |
| 5,283,937 A * | 2/1994 | Uesugi | .................. | 29/281.5 |
| 6,205,638 B1 * | 3/2001 | Yustick | .................. | 29/464 |
| 6,708,393 B1 * | 3/2004 | Roy et al. | .................. | 29/714 |
| 2003/0019090 A1 * | 1/2003 | Matsumoto et al. | .................. | 29/428 |
| 2003/0150094 A1 * | 8/2003 | Tashiro et al. | .................. | 29/428 |

FOREIGN PATENT DOCUMENTS

| | | |
|---|---|---|
| JP | 8142946 | 6/1996 |
| JP | 2000053044 | 2/2000 |
| JP | 2002284057 | 10/2002 |
| JP | 2003040161 | 2/2003 |

* cited by examiner

*Primary Examiner* — David Bryant
*Assistant Examiner* — Christopher Koehler
(74) *Attorney, Agent, or Firm* — Edwards Wildman Palmer LLP; Peter F. Corless

(57) ABSTRACT

The present invention discloses a jig for assembling various types of front end modules to various types of vehicles, comprising: (a) a body movably supported to the ceiling of an assembly line; (b) a car body-fixing part movably mounted to the body to fix various types of vehicles by variably adjusting its fixing position to the front car body of the vehicles; (c) a component-supporting part movably mounted to the body to support the front end module; and (d) a component-holding part mounted to the body and the component-supporting part to fix the front end module by variably change its holding position depending on the types of front end modules.

10 Claims, 5 Drawing Sheets

JIG FOR ASSEMBLING VARIOUS TYPES OF FRONT END MODULES TO VEHICLES

CROSS-REFERENCE TO RELATED APPLICATIONS

The present application claims priority from Korean Patent Application Serial Number 10-2006-0098320 filed on Oct. 10, 2006 with the Korean Intellectual Property Office, the disclosure of which is hereby incorporated by reference herein in its entirety.

FIELD OF THE INVENTION

The present invention relates to a jig for assembling various types of front end modules to vehicles, and more particularly, to a jig for assembling front end modules having various specifications that assembles various types of front end modules to various types of vehicles by using one jig.

BACKGROUND

In recent years, components for vehicles have been modularized and individually separated module components are assembled to vehicles. The modularization is now contributing significantly to the improvement of efficient assembly as well as productivity.

On the other hand, assembling a front end module, one of the modularized components, to a vehicle body, requires a unique jig because front end modules are generally heavy. Moreover, different front end modules have different specifications, and therefore, different types of specific jigs are required for different front end modules of various types of vehicles.

In particular, in an assembly line employing combination systems for various types of vehicle, a specific jig should be provided to assemble a particular front end module corresponding to the specific type of vehicle. As a result, it takes a long time to complete assembly processes, thereby reducing assembly productivity.

There is thus a need for a jig for assembling various types of front end modules to various types of vehicles.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention provides a jig that can be universally used to assemble front end modules having various specifications for different types of vehicles to front car bodies in one assembly line, thereby improving the assembly productivity and ensuring convenient assembly of vehicles.

In one aspect, the present invention provides a jig for assembling various types of front end modules to various types of vehicles, comprising: a body movably supported to the ceiling of an assembly line; a car body-fixing part movably mounted to the body to fix various types of vehicles by variably adjusting its fixing position to the front car body of the vehicles; a component-supporting part movably mounted to the body to support the front end module; and a component-holding part mounted to the body and the component-supporting part to fix the front end module by variably change its holding position depending on the types of front end modules.

A preferred jig may further comprise a component-conveying part disposed between the body and the car body-fixing part and between the body and the component-supporting part to move the front end module to an assembly position of the front car body of the vehicle.

Preferably, the body of the jig according to a preferred embodiment of the present invention may comprise: a plate, mounting brackets connected to both sides of the plate; first linear motion guide blocks mounted to the bottom of the mounting brackets; and second linear motion guide blocks mounted to both sides of the bottom of the plate.

In a preferred embodiment, the car body-fixing part may comprise: first linear motion guide rails on which the first linear motion guide blocks are movably mounted; a frame on which the first linear motion guide rails are mounted; an actuator disposed in front of the frame for adjusting the transverse distance; a link connected with the actuator for adjusting the transverse distance; and an actuator for connecting a pin that is connected with the link and fixed to fenders of the front car body of the vehicle.

In such jigs, the actuator for adjusting the transverse distance may suitably be supported to the frame by a mounting bracket.

Also, the link may preferably comprise a first link that is connected with a plunger of the actuator for adjusting the transverse distance by a pin and a second link that is connected with the first link by a pin through an auxiliary link disposed between the plunger and first link and hinged at the center.

Suitably, guide brackets may be mounted to the frame to individually guide the first link and the second link.

The actuator for connecting the pin may be vertically mounted to each end of the first link and the second link. It also may comprise a reference pin to be inserted into the mounting hole of the fenders of the front car body.

In another embodiment of the present invention, component-supporting part may comprise: second linear motion guide rails on which the second linear motion guide block are movably mounted; a rectangular sub frame on which the second linear motion guide rails are mounted; a vertical frame vertically connected to both sides of the bottom of the sub frame; and a horizontal frame connected to the lower end of the vertical frame.

Preferably, component-holding part may comprise: an actuator for clamping that is mounted to the plate and has a pressing plate to press the upside of the front end module; and an actuator for adjusting inclined direction that is mounted to both sides of the horizontal frame and has master pins to be sequentially fitted into mounting holes formed through both sides of the front end module and side members of the front car body.

Also preferably, the actuator for adjusting the inclined distance may have a plunger that is supported by inclined-mounting brackets at both ends of the horizontal frame and slides up and down with a master pin at the end.

In still another embodiment, component-conveying part may comprise a first longitudinal-moving actuator connecting the plate and the sub frame; and a second longitudinal-moving actuator connecting the plate and the main frame. The first and second longitudinal-moving actuators may preferably be disposed above the plate in the opposite directions and plungers of the first and second longitudinal-moving actuators may be connected to the main frame and the sub frame.

In another aspect, the present invention provides a method of assembling various types of front end modules to various types of vehicles by using a jig that includes a body movably supported to the ceiling of an assembly line, a car body-fixing part and a component-supporting part movably mounted to the body, and a component-holding part mounted to the body and the component-supporting part to fix the front end module, the method comprising the steps of: fixing a vehicle body for assembly operation by variably adjusting at least one fixing position of the car body-fixing part to the front body of the vehicles; and fixing the front end module by variably change at least one holding position of the component-holding part depending on the types of front end modules.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

Other aspects of the invention are discussed infra.

BRIEF DESCRIPTION OF THE DRAWINGS

For a better understanding of the nature and objects of the present invention, reference should be made to the following detailed description with the accompanying drawings, in which.

DETAILED DESCRIPTION

Figure 1:
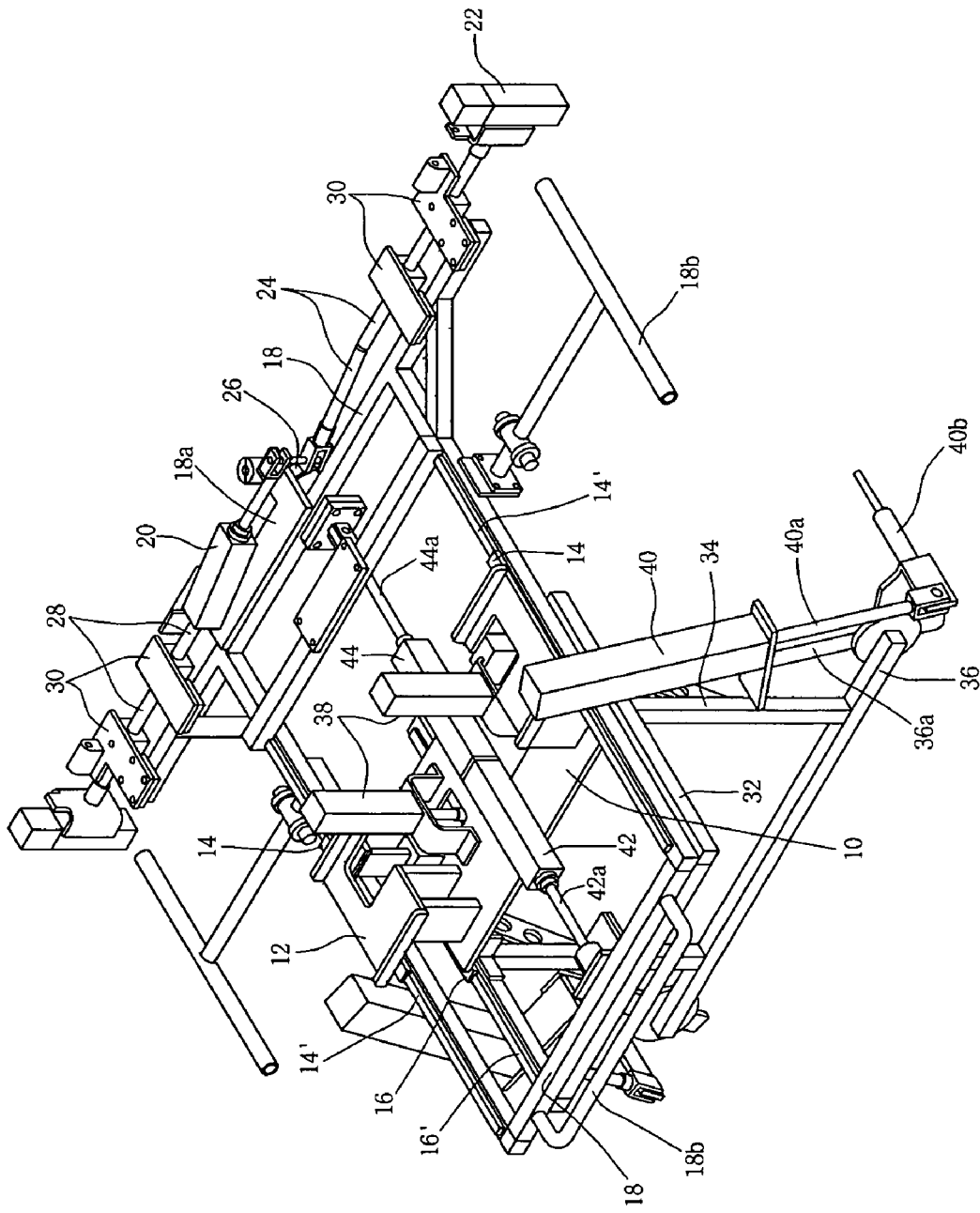
FIG. 1 is a perspective view illustrating configuration of a jig for assembling various types of front end modules to vehicles according to an embodiment of the invention.
Figure 2:
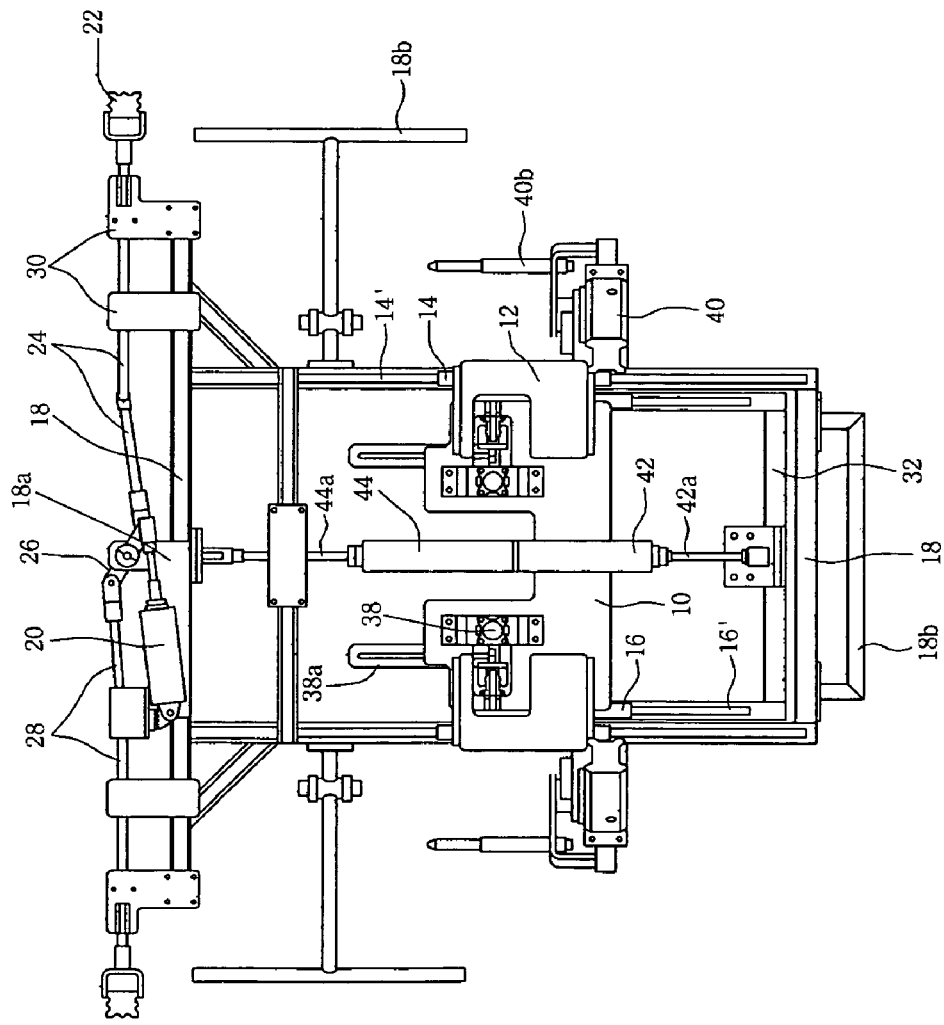
FIG. 2 is a plan view of the jig for assembling various types of front end modules to vehicles of FIG. 1.
Figure 3:
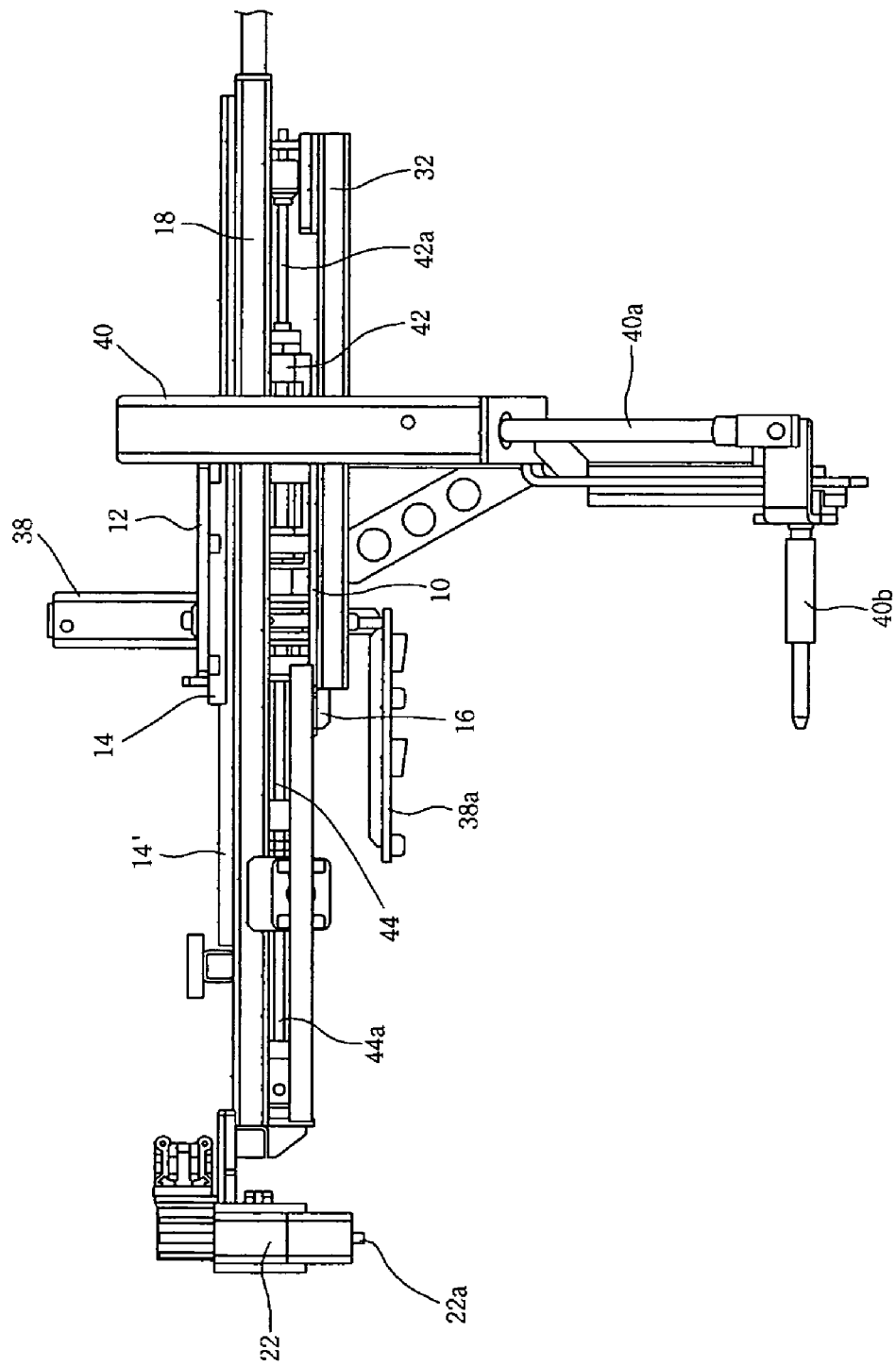
FIG. 3 is a side view of the jig for assembling various types of front end modules to vehicles of FIG. 1.
Figure 4:
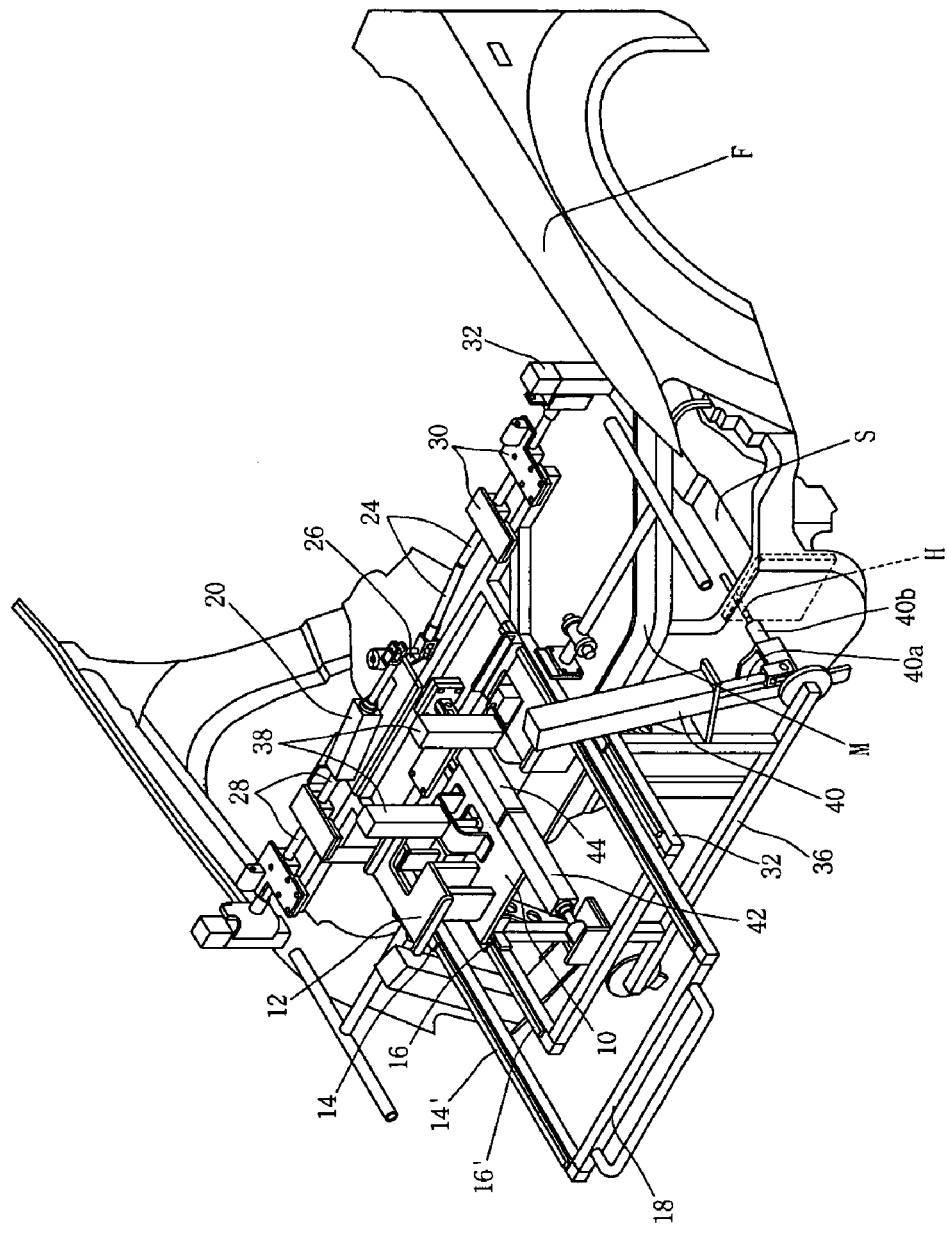
FIG. 4 is a view illustrating operation of the jig for assembling various types of front end modules to vehicles according to the embodiment of the invention.
Figure 5:
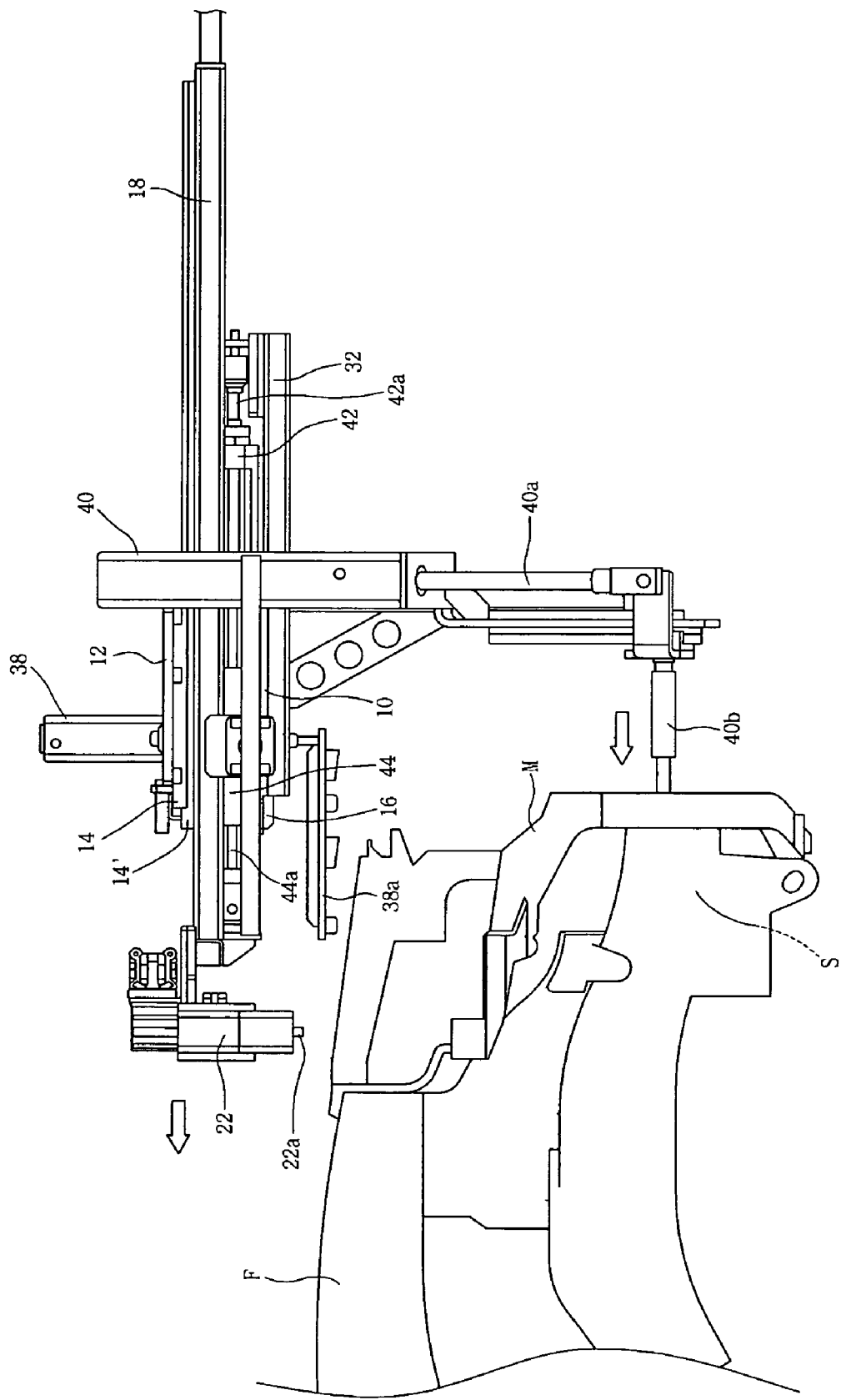
FIG. 5 is a side view of the jig of FIG. 4.

Hereinafter, reference will now be made in detail to the preferred embodiment of the present invention. The embodiments are described below so as to explain the present invention by referring to the figures.

As discussed above, in one aspect, the present invention provides a jig for assembling various types of front end modules to various types of vehicles, comprising: a body movably supported to the ceiling of an assembly line; a car body-fixing part movably mounted to the body to fix various types of vehicles by variably adjusting its fixing position to the front car body of the vehicles; a component-supporting part movably mounted to the body to support the front end module; and a component-holding part mounted to the body and the component-supporting part to fix the front end module by variably change its holding position depending on the types of front end modules.

As shown in the figures, a jig according to a preferred embodiment of the present invention can hold and move a front end module M to a desired assembly position so that the front end module can be assembled into the front car body of a vehicle in an assembly line. Such a jig comprises a body, a car body-fixing part, a component-supporting part, and a component-holding part. It may further comprise a component-conveying part.

The body has a plate 10 that is movably supported by balancing mechanisms (not shown) mounted to the ceiling of an assembly line.

The car body-fixing part is disposed movably on a predetermined path with respect to the body. It is can change its fixed position with respect to the front car body according to the type of vehicle to fix that to the fenders F of the front car body.

The component-supporting part is disposed movably in a predetermined path with respect to the body to support front end module M.

The component-holding part is mounted to the body and the component-supporting part to fix the upper end and lower end of front end module M, respectively. The component-holding part mounted to the component-supporting part can change the holding position according to the type of front end module M.

The component-conveying part is disposed between the body and car body-fixing part, and between the body and component-supporting part. It can move front end module M to a desired assembly position in consideration of the assembly position, which is different depending on the type of vehicle, in the front car body.

More particularly, the body includes plate 10, mounting brackets 12 that are connected to and positioned over both sides of plate 10 and form seats for balancing mechanisms, first linear motion guide blocks 14 that are longitudinally mounted to the bottom of mounting brackets 12, and second linear motion guide blocks 16 that are longitudinally mounted to both sides of the bottom of plate 10.

The car body-fixing part includes first linear motion guide rails 14' on which the first linear motion guide blocks 14 are movably mounted, a rectangular main frame 18 on which first linear motion guide rails 14' are mounted, an actuator 20 for adjusting the transverse distance that is disposed in front of main frame 18, a link that is combined with actuator 20 for adjusting the transverse distance, and an actuator 22 for connecting pin that has a reference pin 22a to be inserted into a mounting hole (not shown) of fenders F and is connected with the link.

As for the above configuration, actuator 20 for adjusting the transverse distance is supported by a mounting bracket 18a in front of main frame 18. The link comprises a first link 24 that is connected with a plunger 20a of the actuator 20 for adjusting the transverse distance by a pin and a second link 28 that is connected with first link 24 by a pin through a auxiliary link 26 that is disposed between the plunger 20a and first link and hinged at the center.

Several guide brackets 30 are provided to receive first link 24 and second link 28 and accurately guide them, along predetermined paths in front of the main frame 18.

Actuator 22 for connecting pin is vertically mounted to each end of first link 24 and second link 28 and its plunger is provided with reference pin 22a to be inserted into the mounting hole of fenders F of the front car body.

The component-supporting part comprises second linear motion guide rails 16' on which the second linear motion guide block are movably mounted, a rectangular sub frame 32 on which second linear motion guide rails 16' are mounted, a vertical frame 34 vertically connected to both sides of the bottom of sub frame 32, and a horizontal frame 36 connected to the lower end of vertical frame 34. Further, the component-supporting part can move with respect to the main frame, while supporting front end module M.

On the other hand, the component-holding part comprises an actuator 38 for clamping that is provided to plate 10 and moves up and down to press the upside of front end module M and an actuator 40 for adjusting an inclined direction that is provided at both sides of horizontal frame 36 and has master pins 40b to be sequentially fitted into mounting holes H formed through side members S of the front car body and both sides of front end module M.

Having the above configuration, actuator 38 for clamping has a pressing plate 38a that is integrally formed with its plunger to press the upside of front end module M.

Actuator 40 for adjusting the inclined distance has a plunger 40a that is supported by inclined-mounting brackets 36a at both ends of horizontal frame 36 and slides up and down with a master pin 40b at the end.

The component-conveying part comprises a first longitudinal-moving actuator 42 that connects plate 10 and sub frame 32 and a second longitudinal-moving actuator 44 that connects plate 10 and main frame 18.

First and second longitudinal-moving actuators 42, 44 are disposed above plate 10 in the opposite directions and their plungers 42a, 44a are connected to main frame 18 and sub frame 32.

As for a jig having the above configuration, various actuators 20, 38, 40, 42, 44 are provided with pressure pipes connected with a pressure source that supplies operating pressure. Operation control means, such as valves, are provided to the pressure pipes to control the operation of actuators 20, 38, 40, 42, 44 by controlling the opening/closing of the pipes. However, as this configuration is well known in the art, it is not shown in the figures.

Further, main frame 18 is longitudinally and transversely provided with handles 18b, which allows an operator to easily adjust the position of the jig while assembling front end module M.

Operation of the jig for assembling various types of front end modules to vehicles according to an embodiment of the invention is described in detail hereafter.

To begin with, after front end module M according to the type of vehicle conveyed along an assembly line is determined, actuator 40 for adjusting the inclined distance is activated to position master pin 40b to the mounting hole on both sides of the front end of front end module M so as to be able to insert the master pin into the mounting hole.

Secondly, actuator 38 for clamping is activated to make pressing plate 38a press the upside of front end module M to prevent separation of front end module M from the component-holding part.

Following the actuator 38 for clamping, actuator 20 for adjusting the transverse distance is activated to position reference pin 22a of actuator 22 for connecting pin to the mounting hole at fenders F of the front car body, and then pin 22a is inserted into the mounting hole of fenders F by actuator 22 for connecting pin and the car body-fixing part is fixedly positioned with respect to the front car body.

Actuator 20 for adjusting the transverse distance simultaneously transmits operational force to first link 24 and second link 28 through auxiliary link 26 and is capable of applying an equal stroke to the left and right by setting appropriate distance from each pin-connecting portion.

Continued from the actuator 38 for clamping, first longitudinal-moving actuator 42 is activated to adjust the position of sub frame 32 in respect to plate 10 and second longitudinal-moving actuator 44 is activated to adjust the position of plate 10 in respect to the front car body.

In other words, when master pin 40b of actuator 40 for adjusting the inclined distance is inserted into the mounting hole at left/right side members S of the front car body by the above activation of first and second longitudinal-moving actuators 42, 44, provisional assembly of front end module M with the front car body is completed. After the provisional assembly is completed, front end module M is completely assembled to the front car body with accuracy by applying fastening at predetermined portions.

On the other hand, in the above assembly of front end module M, front end module M can also be assembled with side members S of the front car body by appropriately controlling first and second longitudinal-moving actuators 42, 44.

For example, where plungers 42a, 44a of first and second longitudinal-moving actuators 42, 44 have been moved forward, the car body-fixing part is fixed to fenders F of the front car body and the component-holding part is fixed to the front end module M at the same time; thereafter, front end module M is moved to the front car body of the vehicle to be assembled by returning only plunger 44a of second longitudinal-moving actuator 44. Assembly of front end module M may be completed through the above operation.

For another example, under the condition where plunger 42a of first longitudinal-moving actuator 42 has been moved forward and plunger 44a of second longitudinal-moving actuator 44 has returned, the car body-fixing part is fixed to fenders F and front end module M is fixed to the component-holding part at the same time; thereafter, front end module M is moved to the front car body of the vehicle to be assembled by returning only plunger 42a of first longitudinal-moving actuator 42. Assembly of front end module M may also be completed through the above operation.

In the above operation, actuator 40 for adjusting the inclined distance is capable of positioning master pin 40b to the mounting hole of front end module M that is conveyed along the assembly line, such that it is not required to use special or specific jigs to assemble the front end modules M having various specifications depending on the type of vehicle.

In addition, actuator 20 for adjusting the transverse distance is also capable of positioning actuator 22 for connecting pin to the mounting holes of fenders F of the car bodies various types of vehicle to assemble front end module M, such that it is possible to assemble front end module M of various types of vehicles without using additional jigs.

As described above, according to a jig for assembling various types of front end modules to vehicles of the invention, when a front end module is assembled to various types of vehicles in a single assembly line, a front end module according to each type of vehicle can be assembled to the vehicle by using one jig. Accordingly, it is possible to save time and costs for assembly, improving the assembly productivity. Further, since it is not required to use additional jigs, working convenience can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A jig for assembling various types of front end modules to various types of vehicles, comprising:
   a body movably supported to the ceiling of an assembly line;
   a car body-fixing part movably mounted to the body to fix various types of vehicles by variably adjusting its fixing position to the front car body of the vehicles;
   a component-supporting part movably mounted to the body to support the front end module;
   a component-holding part mounted to the body and the component-supporting part to fix the front end module by variably changing its holding position depending on the types of front end modules, and a component-conveying part disposed between the body and the car body-fixing part and between the body and the component-supporting part to move the front end module to an assembly position of the front car body of the vehicle, wherein the body comprises:
a plate;
mounting brackets connected to both sides of the plate;
first linear motion guide blocks mounted to the bottom of the mounting brackets; and
second linear motion guide blocks mounted to both sides of the bottom of the plate, and
wherein the component-supporting part comprises:
second linear motion guide rails on which the second linear motion guide block are movably mounted;
a rectangular sub frame on which the second linear motion guide rails are mounted;
a vertical frame vertically connected to both sides of the bottom of the sub frame; and
a horizontal frame connected to the lower end of the vertical frame, and wherein the component-holding part comprises:
an actuator for clamping that is mounted to the plate and has a pressing plate to press the upside of the front end module; and
an actuator for adjusting inclined direction that is mounted to both sides of the horizontal frame and has master pins to be sequentially fitted into mounting holes formed through both sides of the front end module and side members of the front car body.

2. The jig as defined in claim 1, wherein the car body-fixing part comprises:
first linear motion guide rails on which the first linear motion guide blocks are movably mounted;
a frame on which the first linear motion guide rails are mounted;
an actuator disposed in front of the frame for adjusting the transverse distance;
a link connected with the actuator for adjusting the transverse distance; and
an actuator for connecting a pin that is connected with the link and fixed to fenders of the front car body of the vehicle.

3. The jig as defined in claim 2, wherein the actuator for adjusting the transverse distance is supported to the frame by a mounting bracket.

4. The jig as defined in claim 3, wherein the link comprises a first link that is connected with a plunger of the actuator for adjusting the transverse distance by a pin and a second link that is connected with the first link by a pin through a auxiliary link disposed between the plunger and first link and hinged at the center.

5. The jig as defined in claim 4, wherein guide brackets individually guiding the first link and the second link are mounted to the frame.

6. The jig as defined in claim 4, wherein the actuator for connecting the pin is vertically mounted to each end of the first link and the second link.

7. The jig as defined in claim 6, wherein the actuator for connecting the pin comprises a reference pin to be inserted into the mounting hole of the fenders of the front car body.

8. The jig as defined in claim 1, wherein the actuator for adjusting the inclined distance has a plunger that is supported by inclined-mounting brackets at both ends of the horizontal frame and slides up and down with a master pin at the end.

9. The jig as defined in claim 1, wherein the component-conveying part comprises:
a first longitudinal-moving actuator connecting the plate and the sub frame; and
a second longitudinal-moving actuator connecting the plate and the main frame.

10. The jig as defined in claim 9, wherein the first and second longitudinal-moving actuators are disposed above the plate in the opposite directions and plungers of the first and second longitudinal-moving actuators are connected to the main frame and the sub frame.

* * * * *